Aug. 4, 1964 K. M. BROWN 3,143,574
MANUFACTURE OF INDIVIDUAL DISULFIDES
Filed Nov. 14, 1961
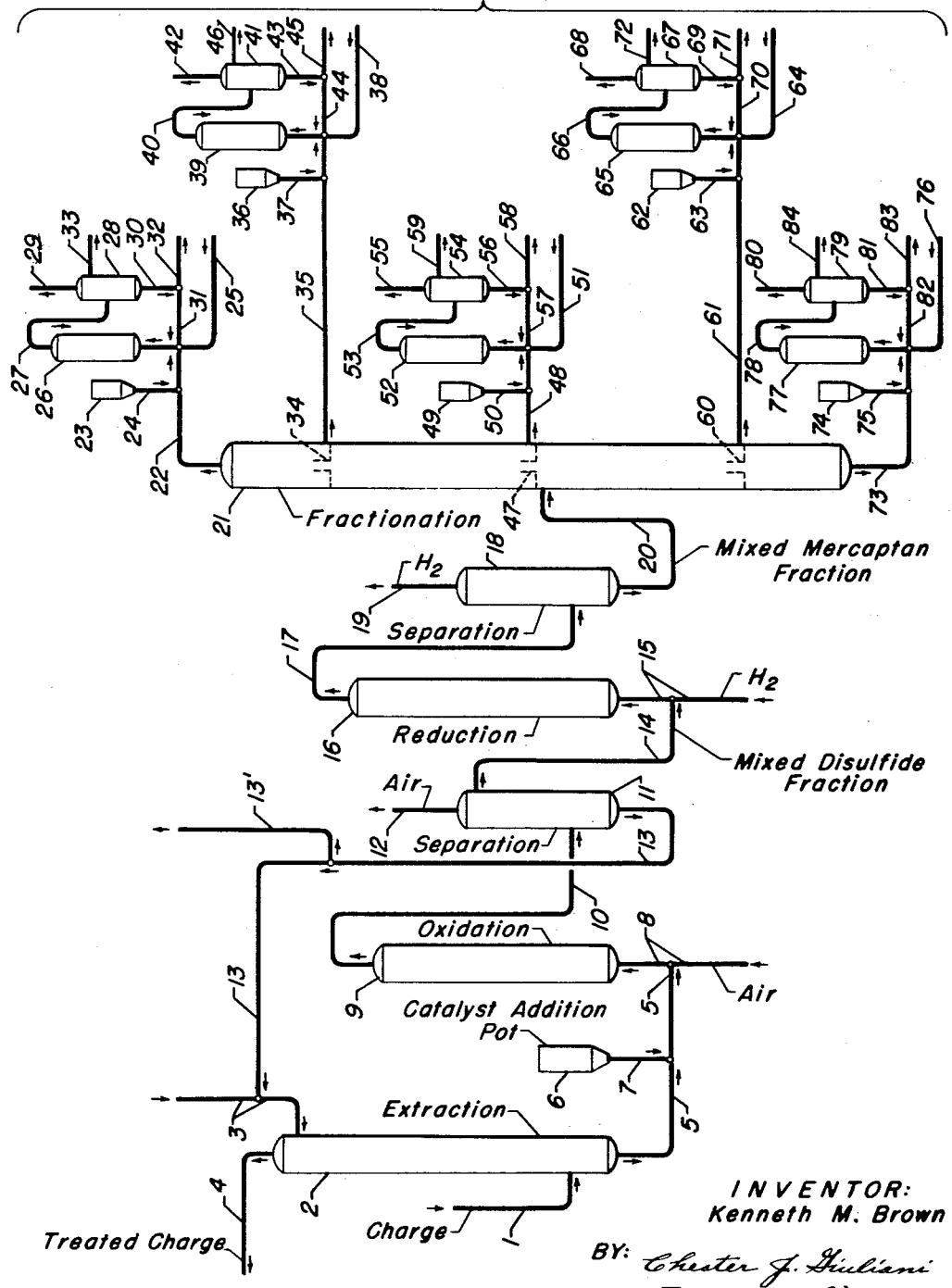
INVENTOR:
Kenneth M. Brown
BY: Chester J. Giuliani
Bernard L. Kramer
ATTORNEYS

United States Patent Office 3,143,574
Patented Aug. 4, 1964

3,143,574
MANUFACTURE OF INDIVIDUAL DISULFIDES
Kenneth M. Brown, Arlington Heights, Ill., assignor to Universal Oil Products Company, Des Plaines, Ill., a corporation of Delaware
Filed Nov. 14, 1961, Ser. No. 152,227
7 Claims. (Cl. 260—608)

This invention relates to a novel method of manufacturing individual disulfides. In many processes a mixed disulfide fraction is recovered and the present invention provides an improved method of converting the mixed disulfide fraction into individual disulfide fractions.

With the advanced technology of present day, more and more chemicals are being tailor-made. Accordingly, there is a demand for individual disulfide fractions for use as such or as intermediates in the preparation of the tailor-made chemical compounds which possess utility as solvents, additives to organic substrates, catalysts, biologically active compounds, insecticides, etc.

As illustrative examples of the physiological and other activity of various dialkyldisulfides, dimethyldisulfide induces paralysis of the respiration of rats and exerts a lipotropic effect when administered peritoneally to young rats. Diethyldisulfide possesses antiseptic properties. Dipropyldisulfide is reported to be a stabilizer for pure hydrocarbons and dibutyldisulfide has been proposed for use as a stabilizer in petroleum wax. Dibutyldisulfide also has been proposed as a catalyst for the addition of thioacetic acid to vinyl fluoride.

In several processes, a mixed disulfide fraction is recovered as a product or by-product of the process. Minical column distillation of such a disulfide fraction shows it to comprise a mixture of different disulfides which may include, for example, dimethyldisulfide, methylethyldisulfide, diethyldisulfide, methylpropyldisulfide, ethylpropyldisulfide, dipropyldisulfide, methylbutyldisulfide, ethylbutyldisulfide, propybutyldisulfide, dibutyldisulfide, etc. The present invention provides a novel method of treating such a mixed disulfide fraction to recover individual disulfide fractions therefrom.

In one embodiment the present invention relates to a method of manufacturing an individual disulfide fraction from a mixed disulfide fraction which comprises converting said mixed disulfide fraction to a mixed mercaptan fraction, fractioning the mixed mercaptan fraction to separate at least one individual mercaptan fraction, separately oridizing the thus separated individual mercaptan fraction to produce an individual disulfide fraction, and separately recovering said individual disulfide fraction.

From the above embodiment it will be seen that the present invention converts a mixed disulfide fraction into individual disulfide fractions. As hereinbefore set forth, mixed disulfide fractions are formed as a product or by-product of several commercial processes and thus the mixed disulfide fractions are readily available, generally at a comparatively low cost. The disulfides are not sufficiently stable in order that separation thereof may be effected readily by high temperature fractionation. In contrast, the mercaptans have a considerably lower boiling point and, therefore, can be fractionated without decomposition at a much lower tmperature. Furthermore, fractionation alone of the mixed disulfides will not decompose the mixed disulfides into the individual mercaptans and then convert them into pure disulfides as accomplished in accordance with the present invention. The present invention accomplishes this by first effecting the reduction of the mixed disulfide fraction to the corresponding mercaptans, fractionation thereof into individual mercaptan fractions and reconversion of the individual mercaptans to individual disulfides.

The invention is further explained with reference to the accompanying flow diagram which illustrates one embodiment of the invention.

As hereinbefore set forth, a mixed disulfide fraction is converted in accordance with the present invention. The mixed disulfide fraction may be obtained from any suitable source. Mercaptans contained in an organic substrate and particularly hydrocarbon fractions are extracted therefrom by means of an alkaline solution and the resultant mercaptides are oxidized to disulfides and regenerated alkaline solution. The disulfides are insoluble in the alkaline solution and are readily separated therefrom by settling. The alkaline solution containing mercaptides may be oxidized in any suitable manner, which may comprise oxidation with air or other oxidizing gas, either in the absence but preferably in the presence of a catalyst. A number of different catalysts have been proposed including, for example, copper compounds, iron compounds, bauxite, etc. A particularly effective catalyst for the oxidation of such alkaline solutions comprises a metal phthalocyanine compound.

In the interest of simplicity the drawing illustrates the use of a phthalocyanine catalyst for effecting the oxidation of the alkaline solution, with the understanding that any other suitable method for oxidizing the mercaptides may be used. The drawing also illustrates the recovery of mercaptans from an organic substrate and particularly hydrocarbon distillate containing mercaptans and the oxidation of the resultant mercaptides to form a mixed disulfide fraction. It is understood that the mixd disulfide fraction may be produced in any suitable manner or obtained from any suitable source.

Referring to the drawing, the charge is introduced into the process through line 1. As hereinbfore set forth, the charge may comprise any mercaptan containing substrate and, in a preferred embodiment, comprises a sour hydrocarbon fraction, which may be gaseous or liquid. A paticularly preferred charge comprises gasoline, including cracked gasoline, straight run gasoline or mixtures thereof.

In the case here illustrated, the charge is introduced, preferably through a suitable spray device not illustrated, into the lower portion of extraction zone 2. In zone 2 the charge is countercurrently contacted with a suitable alkaline solution introduced into the process through line 3 and passed, preferably through a suitable spray device not illustrated, into the upper portion of zone 2. Any suitable alkaline solution may be used for extracting the mercaptans from the charge. Particularly preferred alkaline solutions comprise aqueous solutions of a sodium hydoxide (caustic) and potassium hydroxide. Other alkaline solutions include aqueous solutions of lithium hydroxide, rubidium hydroxide, cesium hydroxide, etc. although, in general, these hydroxides are more expensive and therefore are not preferred for commercial use. In some cases the alkaline solution will contain a solubilizer including for example, alcohols such as methanol, ethanol, etc., phenols, cresols, etc., isobutyrate, etc. A particularly preferred alkaline solution is an aqueous solution of from about 1% to about 50% and still more particularly from about 5% to about 25% by weight concentration of sodium hydroxide.

Extraction of the mercaptans is effected at any suitable temperature which generally will range from atmospheric up to about 250° F., although in some cases higher temperatures may be used which generally will not exceed about 500° F. The pressure may range from atmospheric to 1000 pounds or more and preferably will range from 5 to 200 p.s.i.g. Zone 2 may contain suitable contacting devices including side to side pans, bubble trays, bubble decks, etc., and/or suitable packing material as, for example, carbon Raschig rings, etc.

The treated charge, which now is substantially reduced in mercaptans, is removed through line 4 from the upper portion of zone 2 to any suitable use. When the charge comprises gasoline the gasoline being removed through line 4 will be sweet or substantially sweet and therefore will comprise a premium product. Alkaline solution containing the extracted mercaptans in the form of mercaptides is removed through line 5 from the lower portion of zone 2 and, in the case here illustrated, is commingled with phthalocyanine catalyst supplied from catalyst addition pot 6 and line 7. Air, oxygen or other suitable oxygen-containing gas is introduced through line 8 and the mixture passes into oxidation zone 9. Oxidation zone 9 may contain suitable contacting means including side to side pans, bubble trays, bubble decks, etc. and/or suitable packing such as carbon Raschig rings, etc.

The effluent products from oxidation zone 9 pass through line 10 into separation zone 11, wherefrom excess air is vented through line 12 and an upper mixed disulfide fraction separates from regenerated alkaline solution. The regenerated alkaline solution is recycled from zone 11 by way of lines 13 and 3 for further use in extraction zone 2. When desired, all or a portion of the alkaline solution may be withdrawn from the process through line 13'.

While the drawing illustrates a continuous process for the extraction and oxidation steps, it is understood that these may be batch operations. In a batch operation intimate contacting of the reactants is accomplished in any suitable manner, such as the use of mixing blades in the contacting zones, recirculation of the reaction mixture by pumping the reaction mixture out of and back into the contacting zone, the use of orifice or other mixing devices, etc. While countercurrent flow is illustrated in zone 2, it is understood that concurrent flow, either upwardly or downwardly therethrough may be utilized. Similarly, while concurrent upward flow is illustrated in zone 9, it is understood that downward or countercurrent flow may be used in this zone. While only a single extraction zone 2 and a single oxidation zone 9 are illustrated in the drawing, it is understood that each of these may comprise two or more zones which may be of the vertical type, horizontal type or tubular type, with or without orifice mixers or other contacting devices.

In another method, the phthalocyanine catalyst is disposed as a fixed bed in zone 9 and the alkaline solution and air are passed therethrough in either upward or downward flow. In this embodiment the phthalocyanine catalyst is prepared as a composite with a solid carrier, as will be hereinafter described in detail, and is disposed as a fixed bed in oxidation zone 9.

As hereinbefore set forth, in one embodiment a phthalocyanine catalyst is used in the oxidation of the alkaline solution. Any suitable phthalocyanine catalyst may be used and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, etc. The metal phthalocyanine, in general, is not readily soluble in aqueous solvents and, therefore, when used in an aqueous alkaline solution or for ease of compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst is available commercially and comprises cobalt phthalocyanine disulfonate and also contains cobalt phthalocyanine monosulfonate. Another preferred catalyst comprses vanadium phthalocyanine sulfonate. These compounds may be obtained from any suitable source or may be prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and is converted to the desired carboxylated derivative by conventional hydrolysis.

In one embodiment the phthalocyanine catalyst is prepared as a solution in an alkaline solvent and particularly an aqueous solution of sodium hydroxide (caustic), potassium hydroxide, etc., although in some cases solutions of ammonium hydroxide, lithium hydroxide, rubidium hydroxide and/or cesium hydroxide may be employed. In another embodiment, the phthalocyanine catalyst is used in association with a solid carrier. In some cases, the carrier also may exert a catalytic effect and, in other cases, the carrier may serve merely as a means of dispersing the active component and to extend the available surface. Any suitable carrier may be employed. Charcoal is a particularly preferred carrier. Illustrative charcoals include bone char, wood charcoal, charcoal made from coconut or other nut shells, fruit pits, etc. Other carriers include coke, silica, alumina, silica-alumina composites, etc., which may be either synthetically prepared or naturally occurring, the latter usually being activated by acid, heat or other treatment. When the phthalocyanine catalyst is composited with the carrier, this may be prepared in any suitable manner such as by dipping, suspending, immersing, etc. particles of the solid carrier in a solution containing the phthalocyanine catalyst, or the solution may be sprayed, poured or otherwise contacted with the carrier. It is understood that the carrier may be formed into particles of uniform or irregular size and shape including spheres, pills, pellets, rings, saddles, flakes, etc., either after but preferably prior to compositing with the phthalocyanine catalyst.

Oxidation of the alkaline solution in zone 9 is effected at any suitable temperature which may range from atmospheric to 500° F. or more, although in general it will not be necessary to utilize temperatures above about 250° F. Although atmospheric pressure may be employed, it generally is preferred to utilize superatmospheric pressure which may range from 5 to 1000 pounds or more and generally from 5 to 200 p.s.i.g. The time of contact in zone 9 is controlled to effect the desired oxidation of mercaptides to disulfides and may range from a matter of minutes to 24 hours or more, depending upon the particular operation employed.

In accordance with the present invention, the mixed disulfide fraction is reduced to the corresponding mixed mercaptan fraction. The reduction may be effected in any suitable manner. In the case illustrated in the drawing, the mixed disulfide fraction from zone 11 is passed by way of line 14, commingled with hydrogen introduced through line 15, and introduced into reduction zone 16. Any suitable sulfur-resistant hydrogenation catalyst is used in zone 16 and may comprise, for example, a composite of alumina, silica, zinc oxide, titanium oxide or other suitable carrier with a metal or compound and particularly a sulfide of a group 6 metal, iron group metal or platinum group metal. Particularly preferred catalysts comprise composites of alumina-molybdenum sulfide and alumina-molybdenum sulfide-cobalt sulfide, alumina-nickel sulfide, alumina-nickel sulfide-molybdenum sulfide, alumina-nickel sulfide-cobalt sulfide, etc. Other catalyst composites include alumina-tungsten sulfide, alumina-nickel sulfide-tungsten sulfide, alumina-platinum sulfide, etc.

In another embodiment the reduction of the mixed disulfide fraction is effected by hydrogen formed electrolytically or by the reaction of zinc and acid such as hydrochloric acid, acetic acid, etc., hydrogen produced in a Kipp generator, hydrogen formed by the reaction of sodium and water in the presence of a Raney nickel alloy, etc. As hereinbefore set forth, any suitable method for the reduction of the mixed disulfide fraction may be utilized. In general this reaction is effected in mild temperatures, which may range from atmospheric to 500° F. but is high enough to effect the desired reduction but not severe enough to cause decomposition reactions to a substantial extent. It is understood that the reduction step may be effected either in a continuous or batch type operation and in either one or a plurality of setps. Heating of the charge and cooling of the reaction products are not illustrated in the drawing in the interest of simplicity but will be provided as required.

Regardless of the method of reduction employed in zone 16, the effluent products are directed therefrom through line 17 into separation zone 18. Excess hydrogen is vented through line 19. The mixed mercaptan fraction is withdrawn from zone 18 and passed by way of line 20 into fractionation zone 21. Although illustrated as a single zone, it is understood that the fractionation may be effected in a plurality of zones, equipped with conventional provisions for heating at the bottom and cooling and refluxing at the top. Likewise, the fractionation zone or zones are provided with conventional fractionating means including side to side pans, bubble trays, bubble decks, etc., and, in some cases, a packing material. The extent of fractionation will depend upon the mercaptans contained in the charge to the process and the specific individual disulfide desired.

In the case illustrated in the drawing, the lowest boiling mercaptan is withdrawn from the upper portion of zone 21 and may comprise methyl mercaptan. Ethyl mercaptan is withdrawn from the next lower portion of zone 21, propyl mercaptan from the next lower portion and butyl and higher boiling mercaptans from the bottom portion of zone 21. As mentioned previously, the specific mercaptan fraction or fractions withdrawn from zone 21 will depend upon the mercaptans originally present in the charge and the individual disulfides desired.

For illustrative purposes, it is assumed that methyl mercaptan is contained in the mixed mercaptan fraction charged to zone 21 and will be separated as an overhead fraction therein. The overhead fraction is withdrawn from zone 21 through line 22, commingled with catalyst added from catalyst addition pot 23 and line 24, then commingled with air introduced through line 25 and subjected to oxidation in zone 26. The effluent products from zone 26 are passed by way of line 27 into separation zone 28. Excess air is vented through line 29. When the catalyst is used as a solution in an alkaline solvent, these may be recycled by way of lines 30 and 31 or withdrawn, all or in part, by way of line 32. The dimethyldisulfide fraction is withdrawn from zone 28 through line 33 as a desired product of the process.

Referring to the drawing, it will be noted that four oxidation and separation steps are illustrated for conversion of the fractions separated in zone 21. These steps each will be substantially the same as heretofore described in connection with oxidation zone 9 and separation zone 11 and will use the phthalocyanine catalyst, either in solution in an alkaline solvent or as a fixed bed in the oxidation zone. In the interest of brevity, the specific details of these oxidation and separation zones will not be repeated. Because oxidation of the individual mercaptan fractions will involve smaller volumes, the oxidation and separation zones therefor will be smaller in size than oxidation zone 9 and separation zone 11.

Ethyl mercaptan is withdrawn, in the case here illustrated, from plate 34 in zone 21 and is passed through line 35, commingled with phthalocyanine catalyst introduced from catalyst addition pot 36 and line 37, mixed with air introduced through line 38 and passed into oxidation zone 39. The effluent products are withdrawn through line 40 into separation zone 41, from which air is vented through line 42 and alkaline solution containing catalyst is recycled by way of lines 43 and 44 or withdrawn from the process, all or in part, by way of line 45. Diethyldisulfide is withdrawn through line 46 and is recovered as a desired product of the process.

In the case illustrated in the drawing, i-propyl mercaptan is withdrawn from plate 47 in zone 21, passed through line 48, commingled with phthalocyanine catalyst introduced by way of catalyst addition pot 49 and line 50, commingled with air introduced through line 51 and passed into oxidation zone 52. The effluent products are passed by way of line 53 into separation zone 54, from which excess air is vented by way of line 55, and alkaline solution containing catalyst is withdrawn through line 56 and recycled by way of line 57 or withdrawn from the process, all or in part, by way of line 58. Diisopropyldisulfide is withdrawn through line 59 and is recovered as a desired product of the process.

n-Propyl mercaptan is withdrawn from plate 60 in zone 21, passed by way of line 61, commingled with phthalocyanine catalyst introduced from catalyst addition pot 62 by way of line 63, commingled with air introduced through line 64 and subjected to oxidation in oxidation zone 65. The effluent products pass through line 66 into separation zone 67. Excess air is vented through line 68, and alkaline solution containing catalyst is withdrawn through line 69, recycled by way of line 70 or withdrawn from the process, all or in part, through line 71. Di-n-propyl-disulfide is withdrawn through line 72 and is recovered as a desired product of the process.

In the case here illustrated, the remaining higher boiling mercaptan or mercaptans are withdrawn from zone 21 through line 73, commingled with phthalocyanine catalyst introduced from catalyst addition pot 74 by way of line 75, commingled with air introduced through line 76 and subjected to oxidation in oxidation zone 77. The effluent products pass by way of line 78 into separation zone 79. Excess air is vented through line 80, and alkaline solution containing catalyst is withdrawn through line 81, recycled through line 82 or withdrawn from the process, all or in part, through line 83. Dibutyldisulfide and/or higher boiling disulfides are withdrawn from zone 79 through line 84 and recovered as a desired product of the process.

It is understood that the hereinbefore description is illustrative in intent and that the specific individual disulfides recovered from the process will depend upon the disulfides originally contained in the mixed disulfide fraction introduced by way of line 14 and upon the specific one or more individual disulfide fractions desired. For example, when the charge to the process comprises kerosene, burner oil or other higher boiling fractions, the mercaptans contained therein also will be higher boiling, and the corresponding higher boiling disulfides are formed and recovered as products of the process.

The drawing illustrates the use of the phthalocyanine catalyst in solution. It is understood that one or more of the zones may utilize the catalyst as a fixed bed in the oxidation zone or zones as hereinbefore described. The fixed bed oxidation may be effected in the presence of an alkaline solution and the solution may be recycled from the separation zone back to the oxidation zone by way of the lines illustrated in the drawing.

In the interest of simplicity, valves, pumps, heaters, coolers and other appurtenances have been omitted from the drawing. It is understood that these will be provided as required.

The following examples are introduced to illustrate further the novelty and utility of the present invention but not with the intention of unduly limiting the same.

*Example 1*

Sour thermally cracked gasoline is subjected to extration at atmospheric temperature with 20° Baumé aqueous caustic solution. The sour gasoline has a mercaptan sulfur content of 0.0386% by weight which, by treatment with the sodium hydroxide solution, is reduced to about 0.0002% by weight. The caustic solution containing mercaptides then is subjected to oxidation at 110° F. with air in the presence of cobalt phthalocyanine sulfonate catalyst in a concentration of 50 parts per million based on the caustic solution. The reaction mixture is allowed to settle into an upper mixed disulfide fraction and a lower regenerated alkaline solution containing catalyst. Each fraction is separately withdrawn.

The mixed disulfide fraction recovered in the above manner is subjected to detailed analysis. The fraction has an API gravity at 60° F. of 14.8 and, when subjected to distillation on a minical column, has an initial boiling point of 193° F., a 50% boiling point of 365° F. and a 95% boiling point of 527° F. The distillation curve is continuous and shows only one plateau at about 300° F., thus indicating that the fraction contained about 23% of diethyldisulfide and that the fraction also contained a mixture of other disulfides. It will be noted that this distillation was effected on a minical column using atmospheric distillation up to about 25% overhead and vacuum distillation thereafter. While such fractionation is feasible for laboratory analysis, it is not generally practical in large scale commercial operations.

In accordance with the present invention the mixed disulfide fraction is subjected to reduction with hydrogen in the presence of an alumina-molybdenum sulfide catalyst at 250° F. and 300 p.s.i.g., and the resultant mixed mercaptan fraction is subjected to fractionation to separate individual mercaptan fractions as follows: methyl mercaptan boiling at about 46° F., ethyl mercaptan boiling at about 95° F., isopropyl mercaptan boiling at about 140° F., n-propyl mercaptan boiling at about 154° F. and higher boiling mercaptans. The methyl mercaptan, ethyl mercaptan, isopropyl mercaptan and n-propyl mercaptan are each separately subjected to oxidation at 110° F. with air in the presence of caustic solution containing 50 parts per million by weight of cobalt phthalocyanine sulfonate catalyst.

In accordance with the above processes, a dimethyl-disulfide fraction, a diethyldisulfide fraction, a diisopropyl-disulfide fraction and a di-n-propyl-disulfide fraction are each separately recovered as individual products. Because these disulfide fractions are substantially free of other disulfides, they represent premium products for further use as hereinbefore set forth.

*Example II*

In this example the phthalocyanine catalyst is disposed as a fixed bed in each of the different oxidation zones. The catalyst comprises vanadium phthalocyanine sulfonate. The process is effected in substantially the same manner as described in Example I, and the individual disulfide fractions are recovered as the desired products of the process.

I claim as my invention:

1. A method for recovering an individual alkyl disulfide from a mixture of alkyl disulfides which are not sufficiently stable to permit of separation thereof by high temperature fractionation, said method comprising subjecting said mixture to reduction to form a mixture of alkyl mercaptans of substantially lower boiling points than the corresponding disulfides, whereby the alkyl mercaptan mixture can be fractionated without decomposition at lower temperature than the disulfide mixture, fractionating the mercaptan mixture at the lower temperature to separate at least one individual alkyl mercaptan therefrom, oxidizing the thus separated alkyl mercaptan to convert the same to an individual alkyl disulfide and separately recovering the latter.

2. A method for recovering an individual alkyl disulfide from a mixture of alkyl disulfides which are not sufficiently stable to permit of separation thereof by high temperature fractionation, said method comprising hydrogenating said mixture to form a mixture of alkyl mercaptans of substantially lower boiling points than the corresponding disulfides, whereby the alkyl mercaptan mixture can be fractionated without decomposition at lower temperature than the disulfide mixture, fractionating the mercaptan mixture at the lower temperature to separate at least one individual alkyl mercaptan therefrom, oxidizing the thus separated alkyl mercaptan in the presence of air and a phthalocyanine catalyst to convert the same to an individual alkyl disulfide and separately recovering the latter.

3. The method of claim 2 wherein said hydrogenating is effected in the presence of hydrogen and a sulfur resistant hydrogenating catalyst.

4. The method of claim 2 wherein said phthalocyanine catalyst comprises cobalt phthalocyanine sulfonate catalyst.

5. The method of claim 2 wherein said phthalocyanine catalyst comprises vanadium phthalocyanine sulfonate catalyst.

6. The method of claim 1 wherein said alkyl disulfide mixture is produced by extracting a mercaptan-containing hydrocarbon distillate with an alkaline solution and thereafter oxidizing the resultant solution.

7. The method of claim 6 wherein said oxidizing is effected with air in the presence of a phthalocyanine catalyst.

References Cited in the file of this patent

UNITED STATES PATENTS

| | | |
|---|---|---|
| 2,402,686 | Signaigo | June 25, 1956 |
| 2,789,145 | Neuworth | Apr. 16, 1957 |
| 2,853,432 | Gleim et al. | Sept. 23, 1958 |
| 3,039,855 | Urban | June 19, 1962 |